US009953474B2

(12) United States Patent
Mohan et al.

(10) Patent No.: US 9,953,474 B2
(45) Date of Patent: Apr. 24, 2018

(54) MULTI-LEVEL SECURITY MECHANISM FOR ACCESSING A PANEL

(71) Applicant: Honeywell International Inc., Morris Plains, NJ (US)

(72) Inventors: Reshma Mohan, Bangalore (IN); Galib Gaurav, Saharsa (IN); Malathy Rajkumar, Bangalore (IN); Karthic Sampathkumar, Bangalore (IN); Venkata Prakash Reddy Ankireddy, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/256,372

(22) Filed: Sep. 2, 2016

(65) Prior Publication Data

US 2018/0068504 A1 Mar. 8, 2018

(51) Int. Cl.
*G07C 9/00* (2006.01)
*H04W 64/00* (2009.01)
(Continued)

(52) U.S. Cl.
CPC ..... *G07C 9/00079* (2013.01); *G07C 9/00039* (2013.01); *G07C 9/00103* (2013.01);
(Continued)

(58) Field of Classification Search
CPC .......... G06F 21/32; G06F 21/34; G06F 21/83; G06F 21/35; G06F 21/31; G06F 21/6245; G06F 2203/04106; G06F 2221/2107
(Continued)

(56) References Cited

U.S. PATENT DOCUMENTS 4,864,519 A 9/1989 Appleby et al.
4,916,460 A 4/1990 Powell
(Continued)

FOREIGN PATENT DOCUMENTS

AU 660906 B2 7/1995
CA 2125694 A1 5/1994
(Continued)

OTHER PUBLICATIONS

American Society of Heating, Refrigerating and Air-Conditioning Engineers, Inc., "ASHRAE Addenda a,b,c,d, and g to ANSI/ASHRAE Standard 62,1—2004," 28 pages, 2006.
(Continued)

*Primary Examiner* — Mark Blouin
(74) *Attorney, Agent, or Firm* — Seager, Tufte & Wickhem, LLP

(57) ABSTRACT

A panel associated with maintaining security of mobile devices. The devices such as mobile phones may be registered with user codes at the panel. If a user wants to access the panel, the user may enter a user code corresponding to a number of the device. The device may have a geo-location app in that the panel can track the device. If the user is within the pre-determined range of a protected location, another check about the user may be effected with a face recognition app. A face scan of the user may be compared with a face of an authorized user. If the user is found to be unauthorized anywhere along the above-noted process, then the user may be deemed to be an intruder, and an alert can be sent to a central monitor station, which may take action to remove any threat associated with the intruder.

14 Claims, 4 Drawing Sheets

(51) Int. Cl.
*H04L 29/08* (2006.01)
*H04W 88/02* (2009.01)

(52) U.S. Cl.
CPC ............ *H04L 67/26* (2013.01); *H04W 64/00* (2013.01); *H04W 88/02* (2013.01)

(58) Field of Classification Search
USPC ....................................................... 340/5.53
See application file for complete search history.

(56) References Cited

U.S. PATENT DOCUMENTS

| | | | |
|---|---|---|---|
| 5,039,995 | A | 8/1991 | Hulbert |
| 5,156,203 | A | 10/1992 | Funakoshi et al. |
| 5,178,191 | A | 1/1993 | Schaefer |
| 5,218,356 | A | 6/1993 | Knapp |
| 5,224,648 | A | 7/1993 | Simon et al. |
| 5,316,073 | A | 5/1994 | Klaus et al. |
| 5,355,305 | A | 10/1994 | Seem et al. |
| 5,379,455 | A | 1/1995 | Koschek |
| 5,414,640 | A | 5/1995 | Seem |
| 5,506,768 | A | 4/1996 | Seem et al. |
| 5,550,752 | A | 8/1996 | Federspiel |
| 5,555,195 | A | 9/1996 | Jensen et al. |
| 5,555,196 | A | 9/1996 | Asano |
| 5,568,377 | A | 10/1996 | Seem et al. |
| 5,590,830 | A | 1/1997 | Kettler et al. |
| 5,682,329 | A | 10/1997 | Seem et al. |
| RE35,736 | E | 2/1998 | Powell |
| 5,737,318 | A | 4/1998 | Melnik |
| 5,762,265 | A | 6/1998 | Kitamura et al. |
| 5,769,315 | A | 6/1998 | Drees |
| 5,791,408 | A | 8/1998 | Seem |
| 5,867,384 | A | 2/1999 | Drees et al. |
| 5,960,214 | A | 9/1999 | Sharpe, Jr. et al. |
| 6,006,142 | A | 12/1999 | Seem et al. |
| 6,014,546 | A | 1/2000 | Georges et al. |
| 6,033,302 | A | 3/2000 | Ahmed et al. |
| 6,095,426 | A | 8/2000 | Ahmed et al. |
| 6,122,605 | A | 9/2000 | Drees et al. |
| 6,141,595 | A | 10/2000 | Gloudeman et al. |
| 6,219,590 | B1 | 4/2001 | Bernaden, III et al. |
| 6,219,950 | B1 | 4/2001 | Hsu |
| 6,223,544 | B1 | 5/2001 | Seem |
| 6,265,843 | B1 | 7/2001 | West et al. |
| 6,296,193 | B1 | 10/2001 | West et al. |
| 6,353,853 | B1 | 3/2002 | Gravlin |
| 6,369,716 | B1 | 4/2002 | Abbas et al. |
| 6,389,331 | B1 | 5/2002 | Jensen et al. |
| 6,400,265 | B1 | 6/2002 | Saylor et al. |
| 6,408,228 | B1 | 6/2002 | Seem et al. |
| 6,415,617 | B1 | 7/2002 | Seem |
| 6,437,692 | B1 | 8/2002 | Petite et al. |
| 6,477,439 | B1 | 11/2002 | Bernaden, III et al. |
| 6,480,889 | B1 | 11/2002 | Saito et al. |
| 6,486,778 | B2 | 11/2002 | Mahler et al. |
| 6,594,554 | B1 | 7/2003 | Seem et al. |
| 6,759,956 | B2 | 7/2004 | Menard et al. |
| 6,816,811 | B2 | 11/2004 | Seem |
| 6,826,607 | B1 | 11/2004 | Gelvin et al. |
| 6,829,513 | B2 | 12/2004 | Piersanti et al. |
| 6,842,430 | B1 | 1/2005 | Melnik |
| 6,862,540 | B1 | 3/2005 | Welch et al. |
| 6,874,691 | B1 | 4/2005 | Hildebrand et al. |
| 6,898,542 | B2 | 5/2005 | Ott et al. |
| 6,916,239 | B2 | 7/2005 | Siddaramanna et al. |
| 6,919,790 | B2 | 7/2005 | Kanazawa |
| 6,937,909 | B2 | 8/2005 | Seem |
| 6,959,356 | B2 | 10/2005 | Packwood et al. |
| 7,010,294 | B1 | 3/2006 | Pyotsia et al. |
| 7,031,880 | B1 | 4/2006 | Seem et al. |
| 7,053,767 | B2 | 5/2006 | Petite et al. |
| 7,053,770 | B2 | 5/2006 | Ratiu et al. |
| 7,065,349 | B2 | 6/2006 | Nath et al. |
| 7,085,623 | B2 | 8/2006 | Siegers |
| 7,089,089 | B2 | 8/2006 | Cumming et al. |
| 7,103,511 | B2 | 9/2006 | Petite |
| 7,124,637 | B2 | 10/2006 | Singhal et al. |
| 7,130,719 | B2 | 10/2006 | Ehlers et al. |
| 7,132,757 | B2 | 11/2006 | Steigerwald et al. |
| 7,148,803 | B2 | 12/2006 | Bandy et al. |
| 7,170,201 | B2 | 1/2007 | Hamel et al. |
| 7,176,601 | B2 | 2/2007 | Tanaka et al. |
| 7,251,570 | B2 | 7/2007 | Hancock et al. |
| 7,284,372 | B2 | 10/2007 | Crow |
| 7,317,927 | B2 | 1/2008 | Staton et al. |
| 7,321,316 | B2 | 1/2008 | Hancock et al. |
| 7,349,360 | B2 | 3/2008 | Gutierrez et al. |
| 7,363,031 | B1 | 4/2008 | Aisa |
| 7,378,980 | B2 | 5/2008 | McFarland |
| 7,379,390 | B2 | 5/2008 | McFarland |
| 7,382,271 | B2 | 6/2008 | McFarland |
| 7,388,886 | B2 | 6/2008 | Perkins et al. |
| 7,406,300 | B2 | 7/2008 | Pan |
| 7,426,452 | B2 | 9/2008 | Zielinski et al. |
| 7,433,740 | B2 | 10/2008 | Hesse et al. |
| 7,436,797 | B2 | 10/2008 | Shepard et al. |
| 7,468,661 | B2 | 12/2008 | Petite et al. |
| 7,479,727 | B1 | 1/2009 | Grace |
| 7,496,472 | B2 | 2/2009 | Seem |
| 7,545,267 | B2 | 6/2009 | Stortoni |
| 7,554,941 | B2 | 6/2009 | Ratiu et al. |
| 7,559,529 | B2 | 7/2009 | Affaticati et al. |
| 7,586,888 | B2 | 9/2009 | Wang |
| 7,623,826 | B2 | 11/2009 | Pergal |
| 7,640,007 | B2 | 12/2009 | Chen et al. |
| 7,653,010 | B2 | 1/2010 | Ensor et al. |
| 7,653,394 | B2 | 1/2010 | McMillin |
| 7,660,701 | B2 | 2/2010 | Sharpe, Jr. |
| 7,660,892 | B2 | 2/2010 | Choong et al. |
| 7,728,715 | B2 | 6/2010 | Riedel et al. |
| 7,729,882 | B2 | 6/2010 | Seem |
| 7,751,828 | B2 | 7/2010 | Kim et al. |
| 7,752,309 | B2 | 7/2010 | Keyghobad et al. |
| 7,799,560 | B2 | 9/2010 | Wilson et al. |
| 7,827,813 | B2 | 11/2010 | Seem |
| 7,869,805 | B2 | 1/2011 | Schnaare et al. |
| 7,898,147 | B2 | 3/2011 | Grabinger et al. |
| 7,908,126 | B2 | 3/2011 | Bahel et al. |
| 7,970,350 | B2 | 6/2011 | Sheynman et al. |
| 8,005,514 | B2 | 8/2011 | Saito et al. |
| 8,027,742 | B2 | 9/2011 | Seem et al. |
| 8,036,594 | B2 | 10/2011 | Schadler |
| 8,049,361 | B2 | 11/2011 | Kielb et al. |
| 8,255,090 | B2 | 8/2012 | Frader-Thompson et al. |
| 8,281,174 | B2 | 10/2012 | Seiler |
| 8,370,483 | B2 | 2/2013 | Choong et al. |
| 8,665,084 | B2 * | 3/2014 | Shapiro ................. G08B 3/10 340/506 |
| 8,725,081 | B2 | 5/2014 | Kantzes et al. |
| 8,929,948 | B2 | 1/2015 | Vanderaa et al. |
| 9,008,804 | B2 | 4/2015 | Junk et al. |
| 9,024,717 | B2 | 5/2015 | Songakul et al. |
| 9,049,212 | B2 | 6/2015 | Segre |
| 9,119,236 | B1 * | 8/2015 | Martin ................. G05B 15/02 |
| 9,235,980 | B2 | 1/2016 | Sharma et al. |
| 9,679,453 | B2 * | 6/2017 | Flint ................. H04M 1/0291 |
| 9,729,342 | B2 * | 8/2017 | Cohn ................. H04L 12/2827 |
| 2002/0152298 | A1 | 10/2002 | Kikta et al. |
| 2003/0101009 | A1 | 5/2003 | Seem |
| 2003/0151513 | A1 | 8/2003 | Herrmann et al. |
| 2003/0160693 | A1 | 8/2003 | Hisano |
| 2003/0216837 | A1 | 11/2003 | Reich et al. |
| 2004/0235468 | A1 | 11/2004 | Luebke et al. |
| 2005/0113943 | A1 | 5/2005 | Nian |
| 2005/0228509 | A1 | 10/2005 | James |
| 2005/0285716 | A1 | 12/2005 | Denison et al. |
| 2006/0007945 | A1 | 1/2006 | Schoettle et al. |
| 2006/0063522 | A1 | 3/2006 | McFarland |
| 2006/0063523 | A1 | 3/2006 | McFarland |
| 2006/0104197 | A1 | 5/2006 | Proctor et al. |
| 2006/0193262 | A1 | 8/2006 | McSheffrey et al. |
| 2007/0097993 | A1 | 5/2007 | Bojahra et al. |
| 2007/0191075 | A1 | 8/2007 | Greene et al. |

(56) References Cited

U.S. PATENT DOCUMENTS

| | | |
|---|---|---|
| 2008/0179408 A1 | 7/2008 | Seem |
| 2008/0277486 A1 | 11/2008 | Seem et al. |
| 2008/0290986 A1 | 11/2008 | Laughlin-Parker et al. |
| 2009/0045939 A1 | 2/2009 | Holland et al. |
| 2009/0065596 A1 | 3/2009 | Seem et al. |
| 2009/0136231 A1 | 5/2009 | Lai |
| 2009/0265583 A1 | 10/2009 | Bouse et al. |
| 2009/0307255 A1 | 12/2009 | Park |
| 2010/0121968 A1 | 5/2010 | Clark |
| 2015/0204561 A1 | 7/2015 | Sadwick et al. |
| 2015/0229626 A1 | 8/2015 | Hauhn |
| 2016/0020910 A1 | 1/2016 | Jones et al. |
| 2016/0047565 A1 | 2/2016 | Robinson |
| 2016/0063853 A1 | 3/2016 | Mi |
| 2016/0116177 A1 | 4/2016 | Sikora et al. |
| 2016/0258640 A1 | 9/2016 | Grabinger et al. |

FOREIGN PATENT DOCUMENTS

| | | |
|---|---|---|
| CN | 1291704 A | 4/2001 |
| CN | 1804744 A | 7/2006 |
| CN | 2833675 Y | 11/2006 |
| CN | 1969239 A | 5/2007 |
| CN | 101112077 A | 1/2008 |
| CN | 101299299 A | 11/2008 |
| DE | 69311314 T2 | 10/1997 |
| DE | 19832579 A1 | 3/1999 |
| DE | 10038233 A1 | 2/2001 |
| DE | 6980393 T2 | 6/2003 |
| DE | 10200432050 A1 | 3/2005 |
| EP | 0628181 B1 | 6/1997 |
| EP | 1072847 A2 | 1/2001 |
| EP | 0892330 B1 | 10/2002 |
| EP | 0957418 B1 | 1/2003 |
| EP | 1300771 A2 | 4/2003 |
| EP | 1309062 A2 | 5/2003 |
| EP | 2763106 A2 | 8/2014 |
| EP | 2858385 A1 | 4/2015 |
| JP | 2001050599 A | 1/2001 |
| JP | 2001082786 A | 3/2001 |
| JP | 3242881 B2 | 12/2001 |
| JP | 3358661 B2 | 12/2002 |
| JP | 3370673 B2 | 1/2003 |
| JP | 2003162324 A | 6/2003 |
| JP | 2003242212 A | 8/2003 |
| JP | 2005044349 A | 2/2005 |
| SU | 535103 A1 | 11/1976 |
| WO | 9530114 A1 | 11/1995 |
| WO | 0068744 A1 | 11/2000 |
| WO | 03023536 A1 | 3/2003 |
| WO | 2006053211 A2 | 5/2006 |
| WO | 2008127580 A2 | 10/2008 |
| WO | 2009012269 A2 | 1/2009 |
| WO | 2009012282 A2 | 1/2009 |
| WO | 2009018215 A1 | 2/2009 |

OTHER PUBLICATIONS

Bristol "On a New Measure of Interaction for Multivariable Process Control," IEEE Transactions on Automatic Control, vol. AC-11, No. 1, pp. 133-134, Jan. 1966.

Castellanos, "Nest Competitor Zstat Launches Crowdfunding for Wireless Thermostat," downloaded from http://www.bizjournals.com/boston/blog/startups/2014/01/nest-comp . . . , 2 pages, printed Sep. 12, 2014.

Castelvecchi, "Wireless Energy May Power Electronics," MIT TechTalk, vol. 51, No. 9, 8 pages, Nov. 15, 2006.

Churchill et al., "Strain Energy Harvesting for Wireless Sensor Networks," Proceedings of SPIE, vol. 5055, pp. 319-327, 2003.

Fountain et al., "Comfort Control for Short-Term Occupancy," Energy and Buildings, vol. 21, pp. 1-13, 1994.

Hosni et al., "Experimental Results for Heat Gain and Radiant/Convective Split from Equipment in Buildings," ASHRAE Transactions 1999, vol. 5, Part 2, 13 pages, 1999.

Karalis et al., "Wireless Non-Radiative Energy Transfer," 17 pages, prior to Mar. 4, 2015.

Katz, "Residential Piezoelectric Energy Sources," del, 7 pages, Jul. 21, 2004.

Kaushal et al., "Environmental Control Including Ventilation in Hospitals," JK Science, Hospital Notes, vol. 6, No. 4, pp. 229-232, Oct.-Dec. 2004.

Lawrence et al., "Adaptive Thermostat With Bluetooth Technology," ECE4007L02, Group 7, Georgia Institute of Technology, 15 pages, downloaded Apr. 27, 2015.

Lowton et al., "Finding NEMO: On the Accuracy of Inferring Location in IEEE 802.15.4 Networks," ACM, 5 pages, 2006.

Minkel, "Wireless Energy Transfer May Power Devices at a Distance," downloaded from http://www.scientificamerican.com/article/wireless-energy-transfer/, 3 pages, Nov. 14, 2006.

Ramachandran, "Establishing a Regulatory Framework for Distributed Antenna Systems," Thesis Submitted to University of Colorado, 76 pages, 2008.

Rice et al., "An Evaluation of Hospital Special-Ventilation-Room Pressures," Infection Control and Hospital Epidemiology, vol. 22, No. 1, pp. 19-23, Jan. 2001.

Thomas et al., "Feed-Forward in Temperature Control of Buildings," Energy and Buildings, vol. 37, pp. 755-761, 2005.

\* cited by examiner

MULTI-LEVEL SECURITY MECHANISM FOR ACCESSING A PANEL

BACKGROUND

The disclosure pertains to security and particularly to security of mobile phones.

SUMMARY

The disclosure reveals a panel associated with maintaining security of mobile devices. The devices, for example, mobile phones may be registered with user codes at the panel. Numbers of the mobile devices may be mapped to the user codes at the panel. If a user wants to access the panel, then the user may enter a user code corresponding to a phone number of the mobile device. At this point, the user may be authorized to use the mobile device. The device may have a geo-location app in that the panel may track the device particularly if the device comes within a pre-determined range of a protected location. If the user of the device is authorized to be within the pre-determined range, another check about the user may be effected with a face recognition app invoked in a device scan of the face of the user and then the scanned image may be compared with an image of an authorized user that is retrieved and provided by the panel. If the user is found out to be unauthorized to use the mobile device anywhere along the above noted process, then the user may be deemed to be an intruder, and an alert can be sent to a central monitor station, which may take action to remove any threat associated with the intruder.

DESCRIPTION

Figure 1:
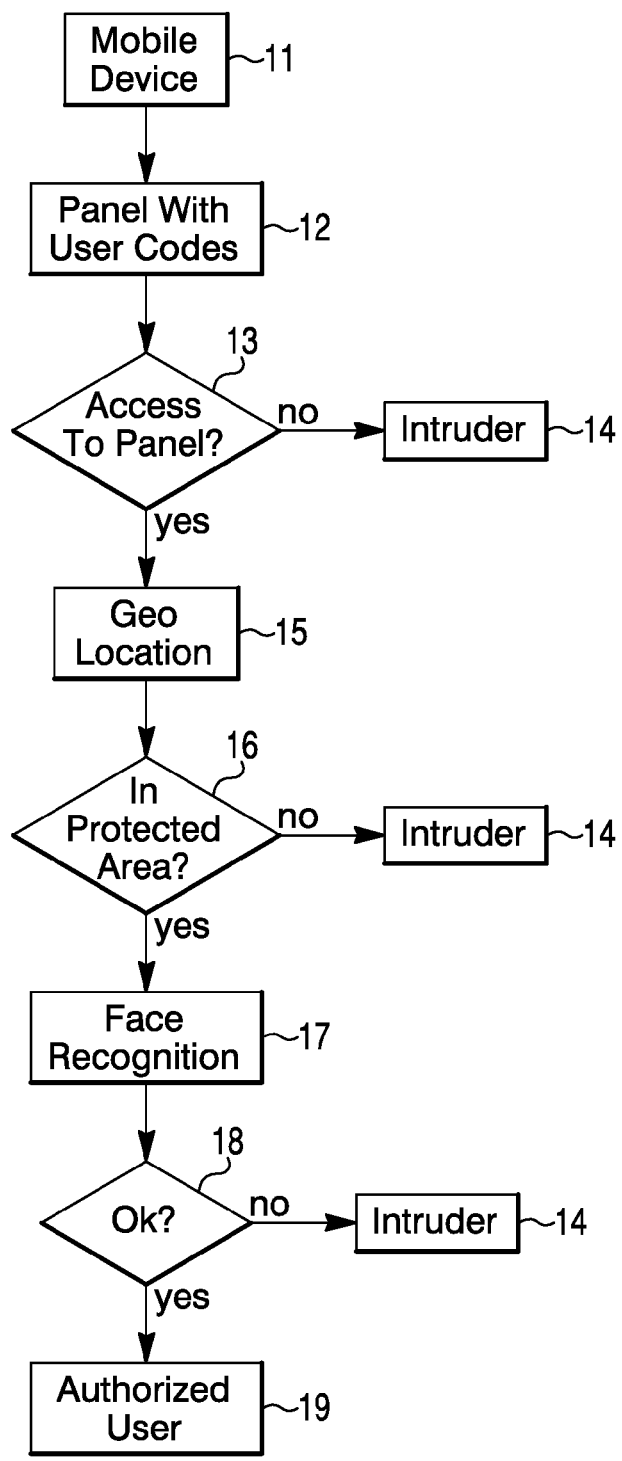
FIG. 1 is a diagram of multi-level security for panel access by a user of, for example, a mobile device.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

User codes for authenticating security access may be easy to replicate and hack. No necessary actions are taken when an unauthorized person tries to operate the panel (like disarming the panel) in absence of authorized users. If the intruder is internal to the family (like a maid) and impersonates the master user code, then there may be a security vulnerability.

Bringing in an extra level of security for accessing a security system may meet a need. The present feature may be easy to implement using geo location application programming interfaces (APIs) and to integrate with an existing security system.

The present approach may involve a mobile phone which makes the present solution feasible. A geo location feature may be supported by mobile phones.

Safety/security system/applications may treat any user who enters a valid user code as an authorized user. If an intruder is trying to access the panel using a valid user code in absence of the authorized user, the present approach and solution may prevent an accession and report the illegal activity to the user and a central monitor station (CMS). The approach may involve two-level security added seamlessly to ensure proper authentication and prevent impersonation.

The present approach may indicate that users' mobile phone numbers should be registered at a panel against particular or unique user codes, respectively. A mobile phone geo location may be added along with entering a user code to authorize a user. A panel may need a list of "friendly" mobile phone numbers mapped against user codes of registered panel users. If the panel is in an armed state (arm away and arm stay) and can be disarmed with valid user code, the panel may track for the presence of any "friendly" mobile phone numbers in its vicinity using geo-location based tracking. Geo location based tracking in the panel may help in tracking friendly mobile numbers within a range of, for example, about twenty 20 meters (a distance which can be customized for each panel) around protected premises. If there are no matches relative to the friendly mobile phone number list, the user accessing the panel may be treated as unauthorized or as an intruder. An alert may be sent to the friendly mobile phone numbers about an intruder presence. Upon acknowledgment, an alert may be sent to a central monitor station (CMS). The CMS may take necessary actions, like informing emergency personnel or police. This approach may be a two-level security added seamlessly to ensure proper authentication and to help to prevent impersonation.

One scenario may involve the panel in an armed away mode when no one is on the premises. Once a user enters the premises, the panel may identify the user with the intruder's mobile geo location. If any unauthorized person starts to disarm the panel or if any authorized person with less privilege tries to impersonate a user with a high privilege (like the maid), the panel may check for the presence of registered mobile numbers in the premises. If a registered user is not in premises, the panel will treat such user as an intruder. The panel may capture an image of the intruder and send a notification to all registered panel users along with an identity of the intruder. If the intruder has a mobile phone, the mobile phone's identity may be saved in the panel.

Authorized users may acknowledge the notification or a message. A user may have a couple options. An option may be to be treated as a "Known User" or a "Monitor and Send Notification". If the user chooses a "Known User" option, an alert will not necessarily be sent to the CMS. If the user chooses a "Monitor and Send Notification" option, an alert may be sent to the CMS, and the panel will be set to a highest security mode with all event notifications and reporting enabled. The CMS may take necessary actions like informing the emergency people or police along with necessary details of the latter option. In a case of a home owner not responding to an alert, even after three or so reminders, then a notification may be sent to the CMS indicating an unauthorized entry or impersonation.

Another scenario may incorporate a situation when a panel is in an armed stay mode with only perimeter sensors activated. The panel may be aware that friendly mobiles are already within the range. When in an unauthorized entry situation where either an intruder or a maid tries to impersonate a user by disarming with using a master user code, the panel may sound a chime alert with an annunciation about the impersonation.

FIG. 1 is a diagram of a system and approach for access to, for example, a security panel 12 with a mobile device 11. Security panel 12 may have a list of friendly mobile device or phone numbers mapped to a set of user codes. Each mobile phone number may be correlated to a user code that is unique to other user codes in the set of codes at panel 12. A user of mobile device 11 may attempt to gain access to panel 12. With a correct access code, the user may be successful. Without the correct user code the user may be unsuccessful and regarded as an intruder. At symbol 13, it may asked whether the user obtained access to the panel 12. If not, then the user may be regarded as an intruder 14. If so, then the phone of the user may be geo-located by panel 11 at symbol 15. A determination may indicate whether the user is geo-located within a pre-determined range of a protected location at symbol 15. If not, there the user could still be an intruder 14. If yes, then it may be important to verify whether the user is authentic by going to face recognition at symbol 17. A comparison of a scanned face of the user may be compared to a face of an authorized user. If a comparison of the faces reveals them to be different, then the user may be an intruder 14. If the comparison reveals the scanned face and the face of the authorized user to be the same, then the user may be deemed as an authorized user.

Figure 2:
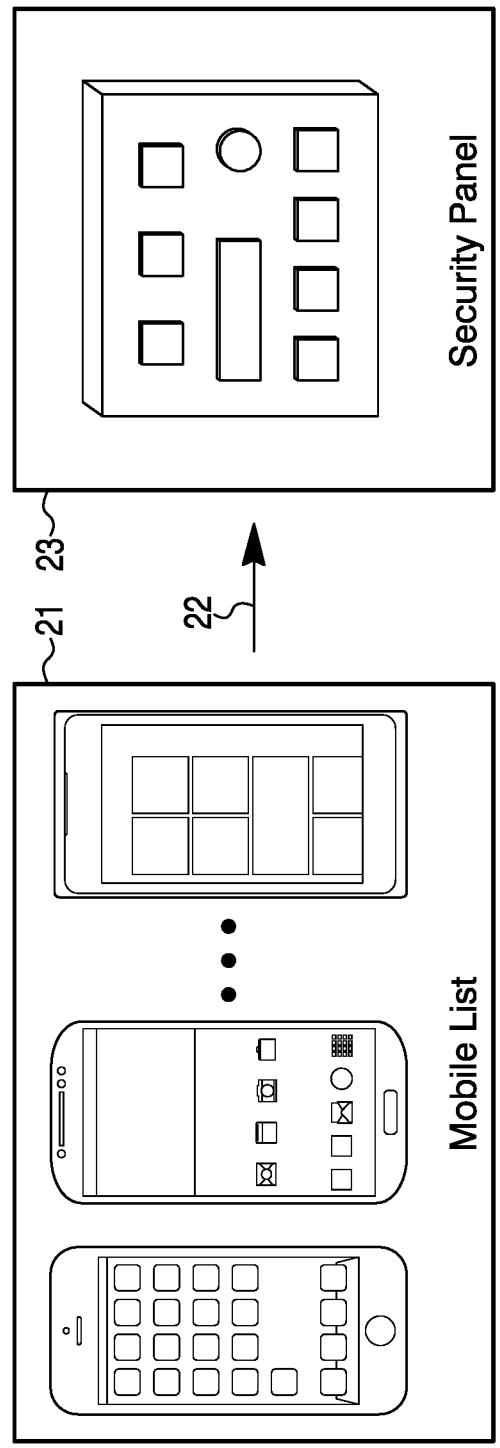
FIG. 2 is a diagram of an enrollment of a mobile device list against user codes at a security panel.

In a diagram of FIG. 2, a solution may incorporate enrolling a mobile list 21 against user codes 22 at a security panel 23.

Figure 3:
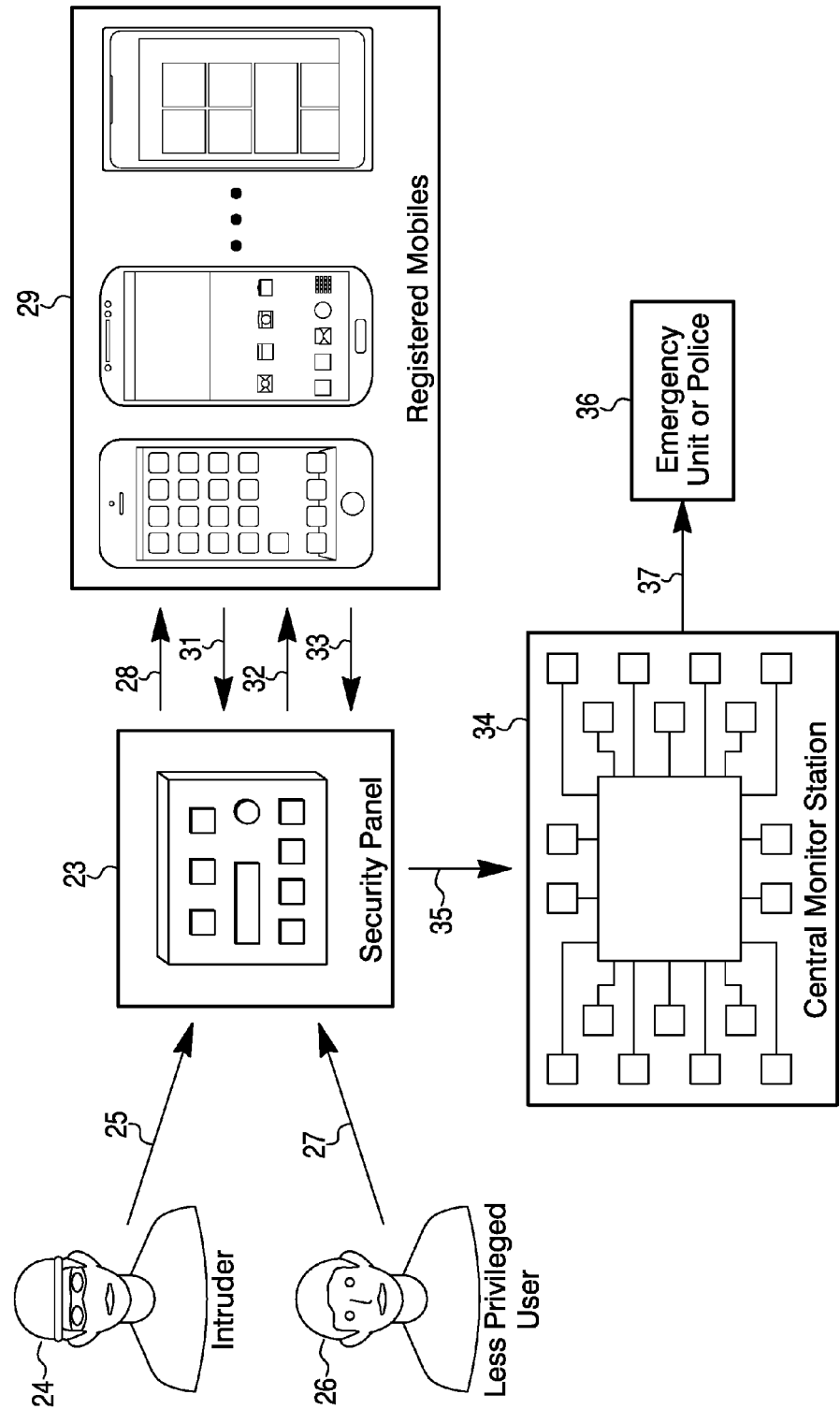
FIG. 3 is a diagram of components that may be involved when an intruder attempts access to a security panel.

According to a diagram of FIG. 3, an intruder 24 may try to enter a valid user code 25 at panel 23. A less or low privileged user 26 may try to enter a master user code 27 at panel 23. Panel 23 may track for a presence of any of the "friendly" mobile numbers in a vicinity of panel 23 using geo-location based tracking at along a connection 28. A registered mobile list 29 may not necessarily be in the premises as indicated at connection 31. An alert may be sent to friendly mobile 29 numbers about an intruder presence via connection 32. A user may acknowledge the alert at connection 33 to panel 23. Upon an acknowledgment, an alert may be sent to a CMS 34 via connection 35. CMS 34 may take necessary actions, like informing an emergency unit or the police 36 via conveyance 37.

Figure 4:
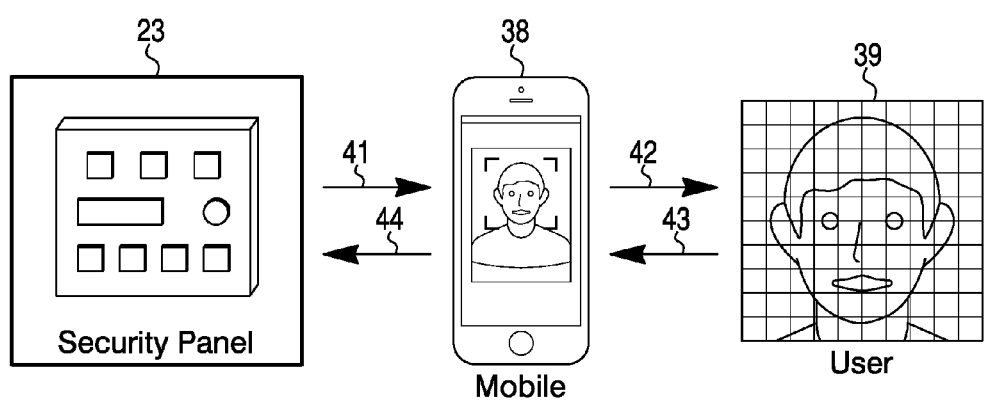
FIG. 4 is a diagram of a face recognition app as implemented in a mobile device.

Face recognition may be added to the present system as indicated by a diagram of FIG. 4. One may assume that a user loses his or her mobile phone and the phone is taken by a third person, and if the third person attempts to access a security panel with a correct code, he or she may be allowed to do so, since the mobile phone is present in the required vicinity. To overcome this issue, one more step may be added in the previous solution (as sub-steps of conveyance 28) where once the security system finds a friendly mobile phone for that user in the required vicinity, may triggers a notification to a face recognition app which becomes present in that mobile phone, to which the user needs to authenticate himself or herself. If user is a genuine user, the face recognition app may send yes flag to the security system or else send no flag. Upon getting yes flag from the mobile app, security system will allow a user to access the security system (panel 23) or else be reported to a central monitor station (CMS). The security system may invoke a face recognition app in the user's phone 38 via connection 44. The user's face may be scanned using the face recognition app 39 via connection 42. The app may authenticate the user along conveyance 43. An authentication result may be sent to security panel 23 along connection 44.

To recap, a security access mechanism may incorporate a security panel, a central monitor station connected to the security panel, and one or more mobile phones. Each of the one or more mobile phones may have a phone number that is registered at the security panel with a user code. The security panel may be in an armed state which can be disarmed with a user code from a mobile phone having the phone number mapped to the user code as registered at the security panel. A geo location app may be provided to each of the one or more mobile phones that is registered with its phone number against a user code at the security panel. The geo location app may permit the security panel to track each mobile phone for its presence within a pre-determine range around a protected premise.

A person may disarm and access the security panel with a mobile phone if the person uses the user code registered at the security panel for the mobile phone.

If the mobile phone that the person is using to access the security panel has no user code registered at the security panel, then the person may be treated by the security panel as an unauthorized caller or an intruder.

If the person is treated as an unauthorized caller or intruder, then an alert indicating an intruder attempting to gain access to the security panel may be sent to the one or more mobile phones that are registered at the security panel according to user codes. If a user of the one or more mobile phones acknowledges the alert, then a second alert about the intruder may be sent to the central monitor station.

Upon receipt of the second alert, the central monitor station may take action to remove any threat associated with the intruder.

If a person disarms and accesses the security panel with a mobile phone and a user code registered at the security panel for that mobile phone, and the mobile phone has a presence within the pre-determined range around the protected premise, then a check of whether the person is an authentic user may be invoked by the security panel with a face recognition app in the mobile phone.

A face of the person using the mobile phone may be scanned by the face recognition app. The face that is scanned may be compared with a face of an authorized user of the mobile phone. A result of a comparison of the face that is scanned with the face of the authorized user of the mobile phone may indicate whether the person is an intruder or the authorized user of the mobile phone.

If the person is indicated to be the intruder with the mobile phone according to the result of the comparison, then an alert may be sent to the central monitor station to take action to remove any threat associated with the person.

A multi-level mobile device security system may incorporate a security panel, one or more mobile devices, and a central monitor station connected to the security panel. The one or more mobile devices may have numbers that are registered at the security panel with user codes, respectively. The security panel may be armed and can be disarmed by a mobile number that is registered with a user code at the security panel. The security panel may track the one or more mobile devices that have numbers registered with the user codes at the security panel, within a pre-determined range around a protected location.

The security panel may contain a friendly mobile device number list that incorporates the numbers of the one or more mobile devices that have their numbers registered with user codes, respectively, at the security panel.

If a mobile device is within the pre-determined range and a number of the mobile device is absent from the friendly mobile device number list, then a user of the mobile device accessing the security panel may be regarded as an unauthorized user and thus an intruder.

Upon the user being regarded as an intruder, an alert about a presence of the intruder within the pre-determined range may be sent to the numbers of the friendly mobile device number list.

If an acknowledgement to the alert is received by the security panel, then an alert may be sent to a central monitor station, which takes action to remove the intruder or any issue associated with the intruder.

If a person, other than an authorized user of a mobile device, accesses the security panel with a correct user code of the mobile device, and the mobile device is with the pre-determined range, the security panel may trigger a notification to a face recognition app that becomes present in the mobile device for authentication or of non-authentication the person as an authorized user of the device, with a scan of a face of the person using the mobile device, which is compared with a face of the authorized user of the mobile device.

If a comparison of the scan of the face of the person using the mobile device with the face of the authorized user results in a non-similarity of the two faces, than the person using the mobile device may be regarded as an intruder.

An approach for obtaining authorized access to a security panel, may incorporate entering a user code for each of one or more mobile phones in a security panel, connecting a central monitor station to the security panel, mapping numbers of the one or more mobile phones to the user codes at the security panel, and adding a geo location app to each of the one or more mobile phones for tracking a mobile phone of the one or more mobile phones by the security panel.

The approach may further incorporate determining whether a person using a mobile phone of the one or more mobile phones is an intruder.

Determining whether a person using a selected mobile phone of the one or more mobile phones is an intruder, may incorporate checking that the user code entered by the person at the security panel corresponds to a user code that is mapped to a phone number of the selected mobile phone at the security panel, and checking that a presence of the selected mobile phone with the geo location app in the selected mobile phone by the security panel is outside of a pre-determined range around a protected premise.

Determining whether a person using a selected mobile phone of the one or more mobile phones is an intruder, may further incorporate invoking a face recognition app in the selected mobile phone. A face of the person using the selected mobile phone may be scanned with the face recognition app. The face that is scanned may be compared by the security panel with a face of an authorized user of the selected mobile phone. A result of a comparison of the face that is scanned with the face of an authorized user of the selected mobile phone may indicate whether the person is an authorized user of the selected mobile phone or an intruder.

If the person using the selected mobile phone is an intruder, then a message may be conveyed by the security panel to the central monitor station to remove any threat associated with the person.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A security access mechanism comprising:
   a security panel;
   a central monitor station connected to the security panel; and
   one or more mobile phones; and
   wherein:
   each of the one or more mobile phones has a phone number that is registered at the security panel with a user code;
   the security panel is in an armed state which can be disarmed with a user code from a mobile phone having the phone number mapped to the user code as registered at the security panel;
   a geo location app is provided to each of the one or more mobile phones that is registered with its phone number against a user code at the security panel;
   the geo location app permits the security panel to track each mobile phone for its presence within a pre-determine range around a protected premise;
   a person may disarm and access the security panel with a mobile phone if the person uses the user code registered at the security panel for the mobile phone;
   if the mobile phone that the person is using to access the security panel has no user code registered at the security panel, then the person is treated by the security panel as an unauthorized caller or an intruder;
   if the person is treated as an unauthorized caller or intruder, then an alert indicating an intruder attempting to gain access to the security panel is sent to the one or more mobile phones that are registered at the security panel according to user codes; and
   if a user of the one or more mobile phones acknowledges the alert, then a second alert about the intruder is sent to the central monitor station.

2. The mechanism of claim 1, wherein upon receipt of the second alert, the central monitor station takes action to remove any threat associated with the intruder.

3. A multi-level mobile device security system comprising:
   a security panel;
   one or more mobile devices; and
   a central monitor station connected to the security panel; and
   wherein:
   the one or more mobile devices have numbers that are registered at the security panel with user codes, respectively;
   the security panel is armed and can be disarmed by a mobile number that is registered with a user code at the security panel;
   the security panel tracks the one or more mobile devices that have numbers registered with the user codes at the security panel, within a pre-determined range around a protected location; and the security panel contains a friendly mobile device number list that comprises the numbers of the one or more mobile devices that have their numbers registered with user codes, respectively, at the security panel.

4. The system of claim 3, wherein if a mobile device is within the pre-determined range and a number of the mobile device is absent from the friendly mobile device number list, then a user of the mobile device accessing the security panel is regarded as an unauthorized user and thus an intruder.

5. The system of claim 4, wherein upon the user being regarded as an intruder, an alert about a presence of the intruder within the pre-determined range is sent to the numbers of the friendly mobile device number list.

6. The system of claim 5, wherein if an acknowledgement to the alert is received by the security panel, then an alert is sent to a central monitor station, which takes action to remove the intruder or any issue associated with the intruder.

7. The system of claim 6, wherein if a comparison of the scan of the face of the person using the mobile device with the face of the authorized user results in a non-similarity of the two faces, than the person using the mobile device is regarded as an intruder.

8. A method for obtaining authorized access to a security panel, comprising:
entering a user code for each of one or more mobile phones in a security panel;
connecting a central monitor station to the security panel;
mapping numbers of the one or more mobile phones to the user codes at the security panel;
adding a geo location app to each of the one or more mobile phones for tracking a mobile phone of the one or more mobile phones by the security panel; and
determining whether a person using a mobile phone of the one or more mobile phones is an intruder; and
wherein determining whether a person using a selected mobile phone of the one or more mobile phones is an intruder, comprises:
checking that the user code entered by the person at the security panel corresponds to a user code that is mapped to a phone number of the selected mobile phone at the security panel; and
checking that a presence of the selected mobile phone with the geo location app in the selected mobile phone by the security panel is outside of a pre-determined range around a protected premise.

9. The method of claim 8, wherein determining whether a person using a selected mobile phone of the one or more mobile phones is an intruder, further comprises:
invoking a face recognition app in the selected mobile phone; and
wherein:
a face of the person using the selected mobile phone is scanned with the face recognition app;
the face that is scanned is compared by the security panel with a face of an authorized user of the selected mobile phone; and
a result of a comparison of the face that is scanned with the face of an authorized user of the selected mobile phone indicates whether the person is an authorized user of the selected mobile phone or an intruder.

10. The method of claim 9, wherein if the person using the selected mobile phone is an intruder, then a message is conveyed by the security panel to the central monitor station to remove any threat associated with the person.

11. A security access mechanism comprising:
a security panel;
a central monitor station connected to the security panel; and
one or more mobile phones; and
wherein:
each of the one or more mobile phones has a phone number that is registered at the security panel with a user code;
the security panel is in an armed state which can be disarmed with a user code from a mobile phone having the phone number mapped to the user code as registered at the security panel;
a geo location app is provided to each of the one or more mobile phones that is registered with its phone number against a user code at the security panel;
the geo location app permits the security panel to track each mobile phone for its presence within a pre-determine range around a protected premise; and
if a person disarms and accesses the security panel with a mobile phone and a user code registered at the security panel for that mobile phone, and the mobile phone has a presence within the pre-determined range around the protected premise, then a check of whether the person is an authentic user is invoked by the security panel with a face recognition app in the mobile phone.

12. The mechanism of claim 11, wherein:
a face of the person using the mobile phone is scanned by the face recognition app;
the face that is scanned is compared with a face of an authorized user of the mobile phone; and
a result of a comparison of the face that is scanned with the face of the authorized user of the mobile phone indicates whether the person is an intruder or the authorized user of the mobile phone.

13. The mechanism of claim 12, wherein if the person is indicated to be the intruder with the mobile phone according to the result of the comparison, then an alert is sent to the central monitor station to take necessary action to remove any threat associated with the person.

14. A multi-level mobile device security system comprising:
a security panel;
one or more mobile devices; and
a central monitor station connected to the security panel; and
wherein:
the one or more mobile devices have numbers that are registered at the security panel with user codes, respectively;
the security panel is armed and can be disarmed by a mobile number that is registered with a user code at the security panel;
the security panel tracks the one or more mobile devices that have numbers registered with the user codes at the security panel, within a pre-determined range around a protected location; and
if a person, other than an authorized user of a mobile device, accesses the security panel with a correct user code of the mobile device, and the mobile device is with the pre-determined range, the security panel triggers a notification to a face recognition app that becomes present in the mobile device for authentication or of non-authentication the person as an authorized user of the device, with a scan of a face of the person using the mobile device, which is compared with a face of the authorized user of the mobile device.

* * * * *